Dec. 19, 1967  R. H. DYSLIN  3,358,548
DRILL SCREW
Filed April 14, 1966
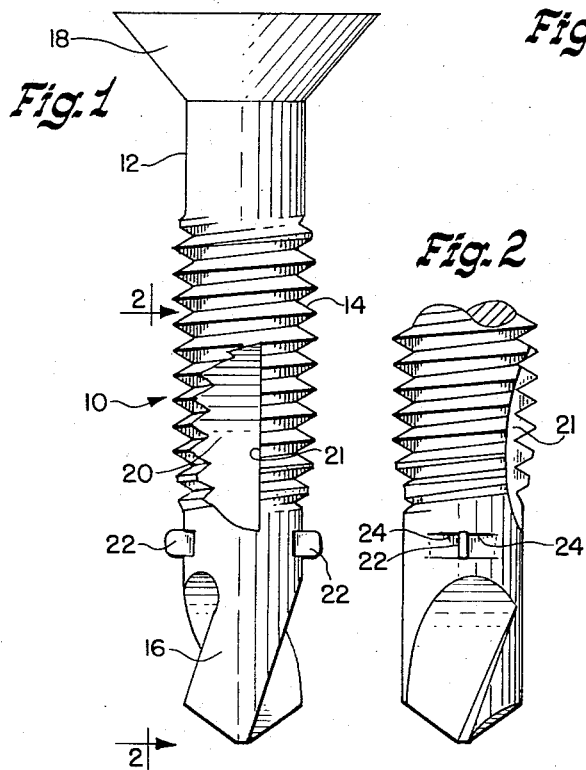
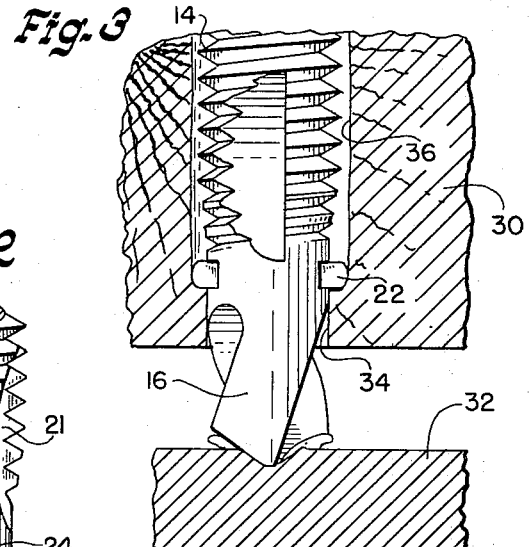
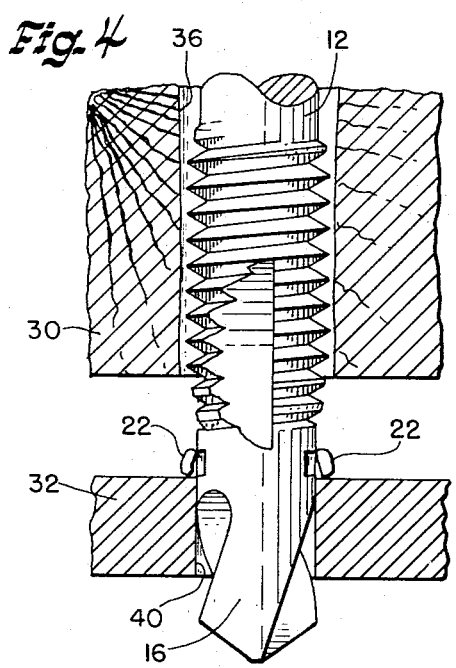
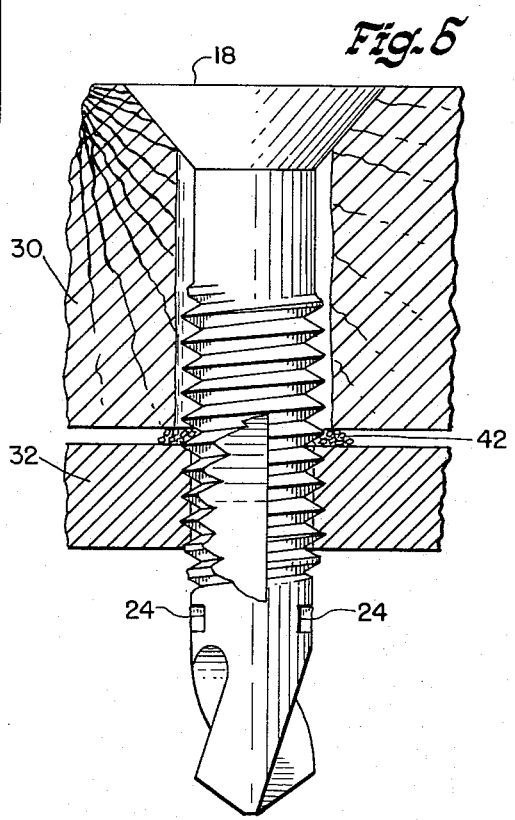
INVENTOR.
Robert H. Dyslin
BY
His Att'ys United States Patent Office 3,358,548
Patented Dec. 19, 1967

3,358,548
DRILL SCREW
Robert H. Dyslin, Morton Grove, Ill., assignor to
Illinois Tool Works Inc., Chicago, Ill., a corporation
of Delaware
Filed Apr. 14, 1966, Ser. No. 542,535
7 Claims. (Cl. 85—47)

ABSTRACT OF THE DISCLOSURE

Self-drilling screw for drilling and fastening a first work member to a harder second work member. Material removing members formed on screw between tip and threads extend radially outwardly to form clearance hole for threads in first work member. Material removing members become inoperative when they are deformed or broken by contact with hard second work member so as to permit threads to be formed in second work member.

---

This invention relates to a drill screw and more particularly relates to a screw adapted to be used in fastening two or more panels in superposed relationship.

It is quite common in fastening two panels together to provide a pilot hole in the first panel with the pilot hole being greater than the major diameter of the screw threads. If such a pilot hole is not provided the threads of the screw will engage said first panel and quite often will not permit the panels to be maintained in juxtaposed relationship since the rate of penetration of the screw into the second panel is different than the rate of movement between the threads of the screw and the first panel. This results in a raising of the first panel away from the second panel and unless they are securely clamped together results in an undesirable or unwanted spacing between adjacent panels.

Therefore, it is an object of this invention to provide a screw threaded fastener capable of avoiding the aforementioned deleterious effects.

A further object of the invention is to provide a drill screw having material removing means thereon which will permit passage of said screw through a first panel without engagement of the screw threads with said first panel and ineffective to remove material from a second harder panel so as to permit the screw threads to engage with the second panel whereby the panels can be drawn by means of the screw into intimate juxtaposed relationship.

Still another object of the present invention is to provide a pair of frangible wing-like elements on the shank of said screw which are stronger than the first panel through which the screw is applied. Said wing-like elements being capable of boring a hole of such size as to be not engaged by said screw threads and said ears further being weaker than the second panel to which the screw is applied whereby the ears are moved relative to said screw shank in such a fashion as to permit intimate threaded engagement between the screw and said second panel.

Still other objects will become apparent to those skilled in the art when the specification and claims are read in conjunction with the accompanying drawings wherein:

FIG. 1 is an elevational view of a screw embodying the principles of this invention;

FIG. 2 is a partial elevational view of the screw shown in FIG. 1 rotated 90° and viewed along lines 2—2 of FIG. 1;

FIGS. 3 and 4 are elevational views in partial section showing the application of a screw embodying the principles of the present invention to a pair of adjacent panels; and FIG. 5 is a showing of the same screw in final mounted position.

Referring now to the drawings wherein similar parts bear similar numerals, a screw 10 embodying the principles of the present invention would include a shank 12 having threads 14 along a substantial portion of its extent, a tip 16 at its entering end and a head 18 provided with suitable driving means (not shown) at the opposite end. The tip 16 in the embodiment disclosed is provided with drilling flutes of the type disclosed in U.S. Patent No. 3,125,923, but for purposes of the present invention drill points of other configurations can be used with equal facility. Similarly, the threaded portion 14 of shank 12 is shown in the illustrated embodiments as having a slot 20 providing a cutting edge 21 in the entering portion of the threaded section 14 for purposes of cutting threads in a workpiece. Once again, this feature while desirable could be omitted if the threads 14 were of a thread-forming configuration or spaced in nature, as is well known in the art.

Intermediate the tip 16 and the threaded portion 14 of the shank 12 there is provided frangible means 22. In the preferred embodiment the frangible means take the form of a pair of ears 22 which are struck from the parent material of shank 12 by any suitable means such as pinch pointing, which is well known in the art. This is generally accomplished by exerting pressure by dies transverse to the axis of the screw and forcing material from the shank to be extruded laterally resulting in slots 24 where material has been removed to form the laterally extending ear 22. The ear 22 preferably extends outwardly from the shank 12 a radial distance equal to or greater than the major diameter of the threaded portion 14. In some instances, however, this radial dimension can be limited to a point where it is less than the major diameter but greater than the pitch diameter of the threads on said shank. Additionally, ears 22 are so dimensioned as to control their physical strength, for purposes best set forth hereinafter.

The specific application of the screw embodying the principles of this invention is best seen in FIGS. 3–5 wherein the screw is used to fasten two superposed panels 30 and 32 of dissimilar materials. The first panel or work member 30 is preferably softer than the second work member or panel 32. In the present embodiment the panel 30 is of wood and panel 32 is of metal. As the screw is applied by axial pressure from the head and rotated the drill point or tip 16 will create its own bore 34 through panel 30 with the ears 22 acting as reamers or counterbores to enlarge the diameter of the bore to form a pilot hole 36. Thus, the threaded portion 14 is permitted free passageway through the pilot hole 36 and will not interfere with the drilling operation in panel 32 since it is not contacting for engaging panel 30.

When the tip 16 has penetrated panel 32 the ears 22 projecting radially from the shank 12 are brought into contact with the upper surface of panel 32. At this point the ears 22, because of their weak structure, will either be completely fractured and separated at the juncture with the shank 12 in slots 24 or alternatively will be wiped back into slot 24 so as to not interfere with further axial movement of the screw in panel 32. In the referred embodiment shown in FIGS. 4 and 5 the ears 22 are fractured and captured between the superposed panels 30 and 32. As the screw axially progresses within the aperture 40 in panel 32 the thread cutting slot 20 and its cutting edge 21 will form mating threads in panel 32 whereby engagement of the head 18 with the opposite surface of panel 30 results in the drawing of panel 30 into juxtaposed relation to the other work panel 32, separated solely by the chips or other waste material 42 which is a by-product of the drilling operation. As was previously indicated, a screw embodying the inventive concepts can utilize the thread-forming threads rather than a thread-cutting slot as shown in this embodiment.

Thusly, it has been shown that the provision of frangible ears 22 in a predetermined position between the tip and threaded portion of a screw permits the use of such a screw to fasten unclamped workpieces into juxtaposed relationship when the ears 22 are stronger than the first workpiece and weaker than the second workpiece. Screws of this nature are ideally suited for fastening work panels to metallic structural elements and obviate the necessity of predrilling or providing an oversized pilot hole in the first work member to be engaged by the screw. It permits complete draw up of two members into intimate juxtaposed relationship by clamping the members between the head of the fastener and the thread engagement of the shank with the second member. It should be recognized, of course, that a plurality of members softer than the frangible ears can be intimately associated with a structural member which is stronger than the ears 22 and capable of either fracturing or wiping back the ears into an inoperative condition.

While other embodiments of this invention will be apparent to those skilled in the art, it is my intention that I be limited solely by the appended claims.

I claim:

1. A screw adapted to fasten two or more juxtaposed work members including a drilling tip, a threaded shank and a head, said shank being threaded for a substantial portion of its length adjacent said head, material removing means located on and extending radially outwardly from said shank between said threads and said tip and adapted to provide a clearance hole in at least the first one of said work members contacted by said screw but not in another of said work members which is harder material than said first work member whereby when said material removing means contacts said harder material its effective radial extent will be reduced so that said threaded shank will effectively engage only said other work member of harder material.

2. A screw of the type claimed in claim 1 wherein said material removing means is frangibly connected to said shank and adapted to fracture when brought into driving contact with one of said work members.

3. A screw of the type claimed in claim 2 wherein said frangible means is initially integral with said shank and positioned between said tip and the threaded portion of said shank.

4. A screw of the type claimed in claim 3 wherein said frangible means are two or more ears pinched from the parent metal of said shank.

5. A screw of the type claimed in claim 4 wherein said ears at their laterally outwardly extremities generate a circle upon rotation of the screw equal to or larger than the crest diameter of the threaded portion of said shank.

6. A screw of the type claimed in claim 4 in combination with a pair of dissimilar work members wherein the first work member is softer than said ears and the second work member is harder than said ears, said ears adapted to cut a clearance hole in said first work member and to be displaced relative to said shank upon contacting said second work member whereby the threads on said shank will actively engage only said second work member and thereby permit said threads in cooperation with said head to pull both said work members into juxtaposition.

7. A screw of the type claimed in claim 6 including a slot in the threaded portion of said shank adapted to cut a thread form in the second work member.

References Cited

UNITED STATES PATENTS

| | | | |
|---|---|---|---|
| 126,366 | 4/1872 | Wills | 85—43 |
| 684,774 | 10/1901 | Baggs | 85—41 |
| 1,084,643 | 1/1914 | Lasater | 85—43 |
| 2,959,086 | 11/1960 | Gerlach | 85—43 |
| 2,996,943 | 8/1961 | Johnson | 85—41 |
| 3,045,523 | 7/1962 | Reed | 85—47 |
| 3,318,182 | 5/1967 | Carlson | 85—41 |

MARION PARSONS, JR., *Primary Examiner.*